United States Patent
Douglas, Jr. et al.

(10) Patent No.: US 10,743,137 B2
(45) Date of Patent: *Aug. 11, 2020

(54) SYSTEMS AND METHODS FOR FACILITATING DYNAMIC REMOTE ASSISTANCE NETWORKS

(71) Applicant: Capital One Services, LLC, McLean, VA (US)

(72) Inventors: Lawrence Hutchison Douglas, Jr., McLean, VA (US); Ya Liu, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,327

(22) Filed: Mar. 11, 2020

(65) Prior Publication Data
US 2020/0213809 A1 Jul. 2, 2020

Related U.S. Application Data

(63) Continuation of application No. 16/695,365, filed on Nov. 26, 2019, now Pat. No. 10,631,128, which is a
(Continued)

(51) Int. Cl.
*H04W 4/02* (2018.01)
*H04W 4/90* (2018.01)
(Continued)

(52) U.S. Cl.
CPC ............ *H04W 4/023* (2013.01); *H04W 4/20* (2013.01); *H04W 4/90* (2018.02); *H04W 12/02* (2013.01)

(58) Field of Classification Search
None
See application file for complete search history.

(56) References Cited

U.S. PATENT DOCUMENTS 7,602,886 B1 * 10/2009 Beech .................. H04W 4/029
379/45
8,396,447 B2 3/2013 Reich
(Continued)

FOREIGN PATENT DOCUMENTS

EP 2752040 A1 7/2014

OTHER PUBLICATIONS

"Mobile App That Changes How We Think of Roadside Assistance," https://www.kickstarter.com/projects/highwayhand/mobile-app-that-changes-how-we-think-of-roadside-a/description.

*Primary Examiner* — Charles N Appiah
*Assistant Examiner* — Frank E Donado
(74) *Attorney, Agent, or Firm* — Troutman Pepper Hamilton Sanders LLP; Christopher J. Forstner; Jon A. Morrissett

(57) ABSTRACT

A system for facilitating remote assistance, the system configured to: receive, from a second computing device, device location data of the second computing device; identify, responsive to receiving a trigger communication from the second computing device, one or more proximate users within a predefined distance of the second computing device; generate an assistance communication including a prompt for assistance; transmit, to one or more third computing devices of the identified proximate users, the assistance communication; receive, from an assisting device among the one or more third computing devices, an assistance response indicative of an indication that the user of the assisting device is willing to assist the user of the second computing device; transmit, to the second computing device, a user profile associated with the user of the assisting device; and responsive to receiving an assistance acceptance, facilitate a communication channel between the second computing device and the assisting device.

22 Claims, 6 Drawing Sheets

Related U.S. Application Data continuation of application No. 16/184,483, filed on Nov. 8, 2018, now Pat. No. 10,499,190.

(51) Int. Cl.
*H04W 4/20* (2018.01)
*H04W 12/02* (2009.01)

(56) References Cited

U.S. PATENT DOCUMENTS

| | | | |
|---|---|---|---|
| 8,538,274 B2 | 9/2013 | Li | |
| 8,862,404 B2 | 10/2014 | Proietty | |
| 9,572,503 B2 | 2/2017 | DeForest | |
| 2008/0009262 A1* | 1/2008 | Rudolf | H04W 4/029 455/404.1 |
| 2011/0065415 A1* | 3/2011 | Miller | H04M 3/4931 455/404.1 |
| 2011/0235627 A1* | 9/2011 | Wang | H04L 63/0428 370/338 |
| 2013/0160138 A1* | 6/2013 | Schultz | G06F 21/6254 726/27 |
| 2014/0226533 A1* | 8/2014 | Bates | H04M 15/06 370/259 |
| 2015/0181027 A1* | 6/2015 | Mossner | H04W 76/10 379/142.04 |
| 2015/0312740 A1* | 10/2015 | Li | H04W 4/30 455/404.2 |
| 2016/0192166 A1 | 6/2016 | DeCharms | |
| 2018/0247029 A1* | 8/2018 | Fish | H04W 12/02 |
| 2018/0249315 A1* | 8/2018 | Mehta | H04W 4/08 |
| 2018/0295478 A1* | 10/2018 | Bohlander | H04W 4/025 |

\* cited by examiner

SYSTEMS AND METHODS FOR FACILITATING DYNAMIC REMOTE ASSISTANCE NETWORKS

CROSS REFERENCE TO RELATED APPLICATION

This application is a continuation of, and claims priority under 35 U.S.C. § 120 to, U.S. application Ser. No. 16/695,365, filed Nov. 26, 2019, which is a continuation of U.S. patent application Ser. No. 16/184,483, filed Nov. 8, 2018, now U.S. Pat. No. 10,499,190, the entire contents of which are fully incorporated herein by reference.

FIELD OF INVENTION

The present disclosure relates generally to systems and method of remote assistance networks and, more particularly, to systems and methods for facilitating dynamic remote assistance networks.

BACKGROUND

Typically, when a driver is faced with an emergency away from home (e.g., while driving) they are faced with the prospect of calling authorities and waiting an undetermined amount of time for help to arrive or hoping for a trustworthy stranger to stop and be able to assist them. However, when a stranger stops to help, the person represents a potential threat of someone come to take advantage of the situation. Further, even if altruistic, there is no guarantee that the stranger will be able to provide the assistance needed. This is especially disconcerting in medical emergencies and other life-threatening situations.

Accordingly, there is a need for improved systems and methods for facilitating remote assistance, and more particularly for facilitating connection between users in need of assistance and other proximate users capable of providing the assistance needed. However, related art systems fail to account for the dynamic nature that facilitating remote assistance requires. Moreover, there may be times when a user may not be physically able to call for assistance. Embodiments of the present disclosure are directed to this and other considerations.

SUMMARY

Disclosed embodiments provide systems and methods for facilitating remote assistance, and more particularly for facilitating connection between users in need of assistance and other proximate users capable of providing the assistance needed.

Consistent with the disclosed embodiments, there may be provided a system including one or more memory devices storing instructions, and one or more processors configured to execute the instructions to perform steps of a method to facilitate connection between users in need of assistance and other proximate users capable of providing the assistance needed. The system may receive, from a user device, device location data representing the location of the user device. The system may then identify, responsive to receiving a trigger communication from the user device, one or more proximate users within a predefined distance of the user device. The system may generate an assistance communication comprising data representing a prompt for assistance. The system may then transmit, to one or more assisting user device associated with respective users of the identified proximate users, the assistance communication. The system may receive, from an assisting device among the one or more assisting user device, an assistance response indicative of an indication that the user of the assisting device is willing to assist the user of the user device. The system may then transmit, to the user device, a user profile associated with the user of the assisting device. Responsive to receiving, an assistance acceptance indicative of a user of the user wishing to connect with the user of the assisting device, the system may facilitate a communication channel between the user device and the assisting device.

In some embodiments, the trigger communication further comprises data representing an indication that there is a problem with a vehicle associated with the user of the second computing device. According to some embodiments, the trigger communication may comprise data representing an indication of a type of assistance needed. For example, in some cases identifying the one or more proximate users may comprise limiting, based at least in part on the indicated type of assistance needed, the one or more identified users to users capable of providing the indicated type of assistance needed. In some cases, the indicated type of assistance needed may be medical assistance and the users capable of providing the indicated type of assistance needed may comprise users with medical training. In other cases, the indicated type of assistance needed may be automotive assistance and the users capable of providing the indicated type of assistance needed may comprise users with automotive training.

In some embodiments, the system may obfuscate the device location data, and may transmit, to the assisting device, the obfuscated device location data. In some cases, the communication channel may provide communication between the second computing device and the assisting device without sharing contact information.

Consistent with additional disclosed embodiments, the system may include one or more memory devices storing instructions, and one or more processors configured to execute the instructions to perform steps of a method to facilitate connection between users in need of assistance and other proximate users capable of providing the assistance needed. The system may receive, from a second computing device linked to the first computing device, trigger event data indicating that a user of the second computing device is in need of assistance. They system may then determine, based at least in part on the trigger event data, a type of assistance needed by the user of the second computing device. Further, the system may generate a trigger communication comprising data indicative of the need of assistance and the determined type of assistance. The system may transmit, to a third communication device, the trigger communication. The system may then receive, from the third computing device, a user profile associated with a user of an assisting device. The system may output for displaying the user profile associated with the user of the assisting device. Responsive to receiving an indication that the user of the second computing device wishes to connect with the user of the assisting device, the system may transmit a request to connect with the assisting computing device, to the third computing device. Finally, the system may establish a communication session with the assisting computing device.

In some disclosed embodiments, the trigger communication further comprises data representing an indication that there is a problem with a vehicle associated with the user of the second computing device. In some example embodiments, the second computing device may be the vehicle associated with the user of the first computing device.

According to some embodiments, the trigger event data may further indicate a problem with the user of the second computing device. In such embodiments, the second computing device may be a monitoring device associated with the user of the first computing device.

Consistent with the disclosed embodiments, there is provided a method to facilitate connection between users in need of assistance and other proximate users capable of providing the assistance needed is provided. The method may include receiving device location data indicative of a location of a computing device. The method may further include receiving a trigger communication. In some embodiments, the method may include determining a type of assistance needed. The method may further include identifying one or more proximate users capable of providing the type of assistance needed within a predefined distance from the computing device. According to some example embodiments, the method may include generating an assistance communication comprising data representing a prompt for assistance. The method may also include transmitting the first assistance communication to the one or more proximate users. In some example embodiments, the method may include receiving, from an assisting user among the one or more proximate users, an assistance response indicative of a willingness to assist the user of the computing device. The method may also include transmitting, to the computing device, a user profile associated with the assisting user. Responsive to receiving, an assistance acceptance indicative of a user of the computing device requesting to connect with the assisting user, the method may include facilitating a communication channel between the computing device and an assisting device associated with the assisting user.

In some disclosed embodiments, the method may further include receiving, from a software application running on the computing device, a requesting user communication. The method may also include transmitting, to a software application running on the assisting device, the requesting user communication. The method may also include receiving, from the software application running on the assisting device, an assisting user communication. Finally, the method may include transmitting, to the software application running on the computing device, the assisting user communication.

According to some embodiments, the communication channel between the computing device and an assisting device associated with the assisting user is encrypted.

In some example embodiments, the method may further comprise generating first proxy communication data associated with the computing device. The method may also include linking the first proxy communication data to an account associated with the user of the computing device. The method may further include generating second proxy communication data associated with the assisting device. The method may also comprise linking the second proxy communication data to an account associated with the assisting user. Finally, the method may comprise transmitting the second proxy communication data to the user of the computing device.

In some embodiments of the disclosure, the first proxy communication data may comprise a first proxy address for communicating with the computing device, and the second proxy communication data may comprise a second proxy address for communicating with the assisting device. According to some example embodiments, the first and second proxy addresses may comprise respective proxy telephony numbers temporarily associated with the computing device and assisting device, respectively.

According to some embodiments of the present disclosure, responsive to receiving a confirmation that the assisting user provided the type of assistance needed to the user of the computing device, the method may comprise prompting the user of the computing device to provide a rating for the assisting user. The method may further comprise associating the rating provided by the user of the computing device with an account associated with the assisting user.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
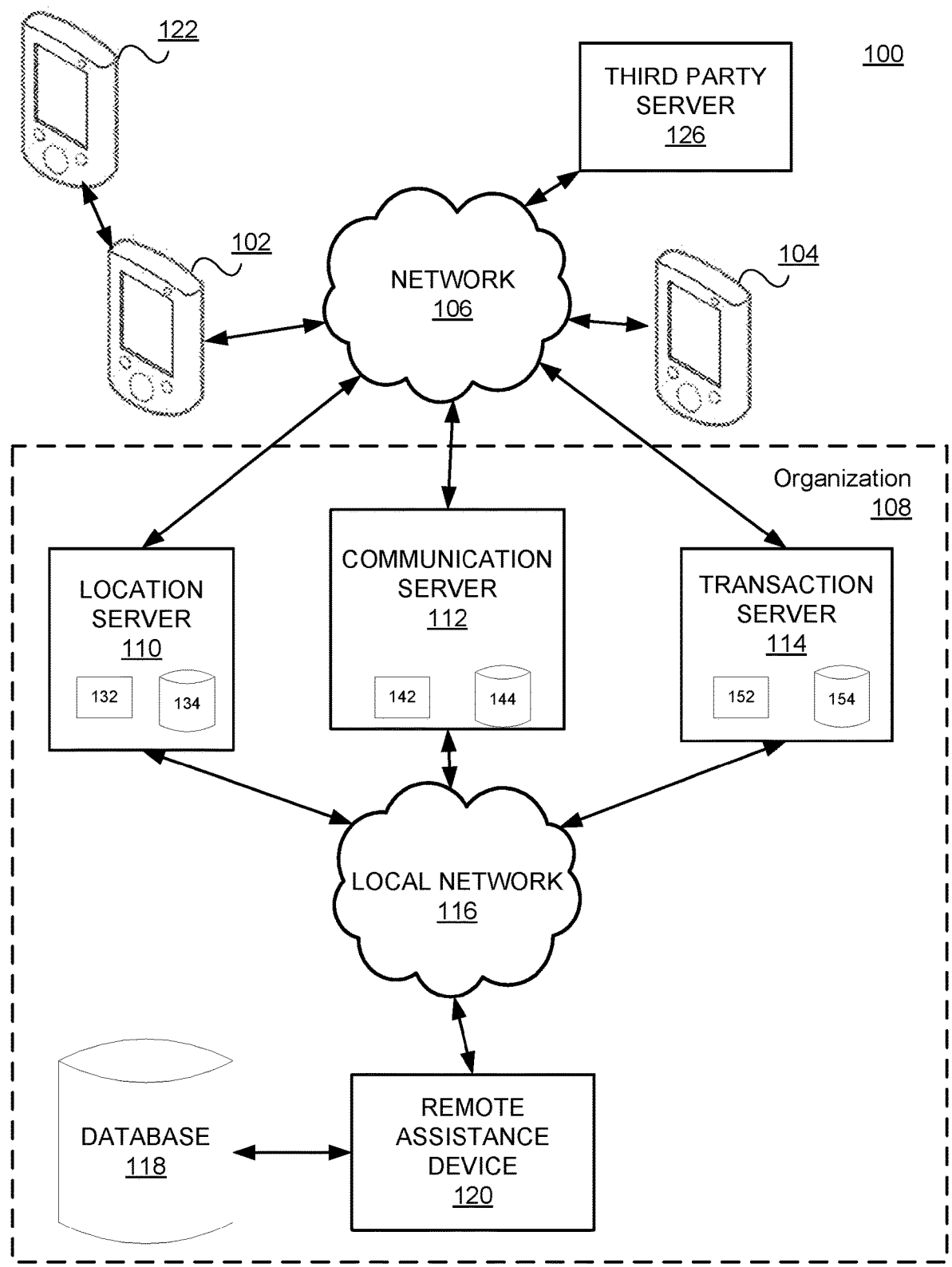
FIG. 1 is a diagram of an example system environment that may be used to facilitate certain aspects of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of the present disclosure may allow a user to contact people in close proximity that are able to provide assistance. According to some embodiments, a user may request to receive help (e.g., user device 102). For example, in some embodiments the user may select an option on a mobile application (e.g., user device 102) to receive help. In some example embodiments, the user may also indicate the type of assistance needed. Once the user requests help, the system may determine (e.g., remote assistance device) the user's location and a list of assisting users who are proximate the user. In certain implementations, the system may determine a list of assisting user within a predetermined distance (e.g., five miles) or a predetermined travel time (e.g., 10 minutes) of the user's location. According to some embodiments where the system has been provided or has determined the type of assistance needed by the user, the system may filter the list of assisting users based on the assisting users' ability to provide the type of assistance needed. In some example embodiments, once the system has determined the list of assisting users, the system may send (e.g., remote assistance device) a profile associated with one of the assisting users to the user. According to some embodiments system (e.g., remote assistance device 120) may transmit a profile associated with one of the assisting users to an application running on the user's mobile phone (e.g., user device 102). In some embodiments, for example, the user may then review the profile and determine whether he or she wishes to connect with the assisting user associated with the profile. In certain implementations, responsive to receiving an indication that the user wishes to connect with the assisting user (e.g., selecting an option on user device 102), the system may establish a communication session between the user and the assisting user. For example, in some embodiments, the system (e.g., remote assistance device 120) may initiate a chat session between an application running on assisting user's device (e.g., user device 104) and an application running on the user's device (e.g., user device 102).

In some embodiments, system (e.g., remote assistance device 120) may allow users to complete a phone call through voice over internet protocol (VOIP) or other similar technology. According to some example embodiments, the communication channel provides communication between user device 102 and assisting device 104 without sharing contact information. System may allow users to communicate within a mobile application without exchanging contacting information such as phone numbers associated with their respective user devices. In some cases, a communication channel between a software application running on user device 102 and a software application running on user device 104 may be encrypted using standard protocols such as TLS, TCP, SSH, or other appropriate protocols. In some embodiments, a communication channel between a software application running on user device 102 and a software application running on user device 104 may be encrypted using application or organization specific protocols specifically developed for the organization. In certain implementations, the communication channel may provide proxy communication between user device 102 and assisting device 104, thereby protecting the privacy of users of user device 102 and assisting device 104. According to some example embodiments, responsive to receiving and indication that the user does not wish to connect with the assisting user (e.g., selecting an option on user device 102), the system may present the user with a different profile associated with a different one of the assisting users.

In some embodiments, a user may desire to contact people in close proximity that are able to provide assistance during a roadside emergency. According to some embodiments, responsive to detecting an emergency situation, a device associated with the user (e.g., monitoring device 122) may transmit a request for assistance. For example, in some embodiments, a user may wear a pacemaker, and upon detection of a serious cardiac event, the pacemaker (e.g., monitoring device 122) may send an alert to an application running on the user's cell phone (e.g., user device 102). In some example embodiments, a computer system associated with the user's vehicle (e.g., monitoring device 122) may, upon detection of an emergency related to the user's vehicle, send an alert to an application running on the user's cell phone (e.g., user device 102). According to some embodiments, responsive to receiving the request for help, the system may determine (e.g., remote assistance device) the user's location and a list of assisting users who are proximate the user, for example, similar to that described above.

Although the certain embodiments are described with respect to systems, it is contemplated that embodiments with identical or substantially similar features may alternatively be implemented as methods and/or non-transitory computer-readable media. Similarly, although the certain embodiments are described with respect to methods, it is contemplated that embodiments with identical or substantially similar features may alternatively be implemented as systems and/or non-transitory computer-readable media.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment 100 that may be configured to perform one or more processes that can provide systems and methods for facilitating remote assistance. The components and arrangements shown in FIG. 1 are not intended to limit the disclosed embodiments as the components used to implement the disclosed processes and features may vary. As shown, system environment 100 may include a requesting user device 102, an assisting user device 104, a monitoring sensor 122, a third-party server 126, a network 106, and an organization 108 including, for example, a location services server 110, a communication server 112, a transaction server 114, a local network 116, a remote assistance device 120, and a database 118.

In some embodiments, a user may operate requesting user device 102 and/or assisting user device 104. Requesting user device 102 and/or assisting user device 104 can include a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108 or with third-party server 126. In some embodiments, a user device may include or incorporate electronic communication devices for hearing or vision impaired users. Requesting user device 102 and/or assisting user device 104 may belong to or be provide by a user, or may be borrowed, rented, or shared. Users may include individuals such as, for example, subscribers, clients, prospective clients, or users of organization 108, such as individuals who have obtained, will obtain, or may obtain a product, service, or consultation from organization 108. According to some embodiments, requesting user device 102 and/or assisting user device 104 may include one or more sensor for obtaining biometric data associated with the user, such as a fingerprint scanner, a microphone and/or digital camera, a geographic location sensor for determining the location of the device, an input/output device such as a transceiver for sending and receiving data, a display for displaying digital images, one or more processors including an authentication processor, and a memory in communication with the one or more processors. According to some embodiments, requesting user device 102 and/or assisting user device 104 may include one or more sensors sensor for obtaining information relevant to the users of respective devices, such as a digital camera, a microphone and/or digital camera, a geographic location sensor for determining the location of the device, an input/output device such as a transceiver for sending and receiving data, a display for displaying digital images, one or more processors including an authentication processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™ ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system environment 100. Network 106 may also include a public switched telephone network ("PSTN") and/or a wireless network.

Third-party server 126 may comprise a computer system associated with an entity other than organization 108 and users that performs one or more functions associated with the individual and organization 108. For example, third-party server 126 can comprise a user verification system that allows a user of requesting user device 102 and/or assisting user device 104 to verify their identity in order to interact with organization 108. In some embodiments, third-party server 126 may be used in conjunction with authentication of a user of a mobile application running on requesting user device 102 and/or assisting user device 104. According to some example embodiments, third-party server 126 may comprise a vehicle monitoring system configured to trigger an application on requesting user device 102 based on a determination that a predetermined event took place. In some embodiments, third-party server 126 may be a server hosted by organization 108. According to some embodiments, third-party server 126 may be a server hosted by a party or entity other than organization 108. In some embodiments, third-party server 126 may user protocols such as OAuth and OpenIDConnect in order to verify the identity of a user of a mobile application running on requesting user device 102 and/or assisting user device 104. In some embodiments, for example, third-party 126 server may be a server associated with the manufacture of requesting user device 102 and/or assisting user device 104.

Organization 108 may include an entity such as a business, corporation, individual, partnership, or any other entity that provides one or more of goods, services, and consultations to individuals such as users.

Organization 108 may include one or more servers and computer systems for performing one or more functions associated with products and/or services that organization 108 provides. Such servers and computer systems may include, for example, location services server 110, communication server 112, and/or transaction server 114, as well as any other computer systems necessary to accomplish tasks associated with organization 108 or the needs of users.

Location services server 110 may include a computer system configured to track the location of requesting user device 102 and/or assisting user device 104 based on information and data received from requesting user device 102 and/or assisting user device 104. For example, location services server 110 may receive location data from requesting user device 102 and/or assisting user device 104, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to requesting user device 102 and/or assisting user device 104 that may be used to determine the location of requesting user device 102 and/or assisting user device 104. According to some embodiments, location services server 110 may store geofencing information that represents a designed location or area. As those of skill in the art will appreciate, a geofence may be a virtual geographic boundary that when crossed by requesting user device 102 and/or assisting user device 104, may trigger system environment 100 to execute one or more actions. According to some embodiments, the contours of a geofence may be predetermined, for example, location services server 110 may receive one or more predetermined geofences that are associated with respective locations from a third party. For example, location services server 110 may receive data representative of a geofence around a particular store from an organization associated with the store that determined the location of the geofence. In some embodiments, the contours of a geofence may be determined by receiving (e.g., from a user of system environment 100) the location of a point (e.g., longitude and latitude) and a radius and setting the contours of the geofence to be equal to the location of a circle draw around the point at the specified radius. In some embodiments, a geofence may be specified by a user of system environment 100 by, for example, drawing the geofencing onto a virtual map or otherwise inputting the location of the geofence.

Location services server 110 may have one or more processors 132 and one or more location services databases 134, which may be any suitable repository of location data. Information stored in location services server 110 may be accessed (e.g., retrieved, updated, and added to) via local network 116 and/or network 106 by one or more devices of system environment 100. In some embodiments, location services server processor 132 may be used to determine the location of requesting user device 102 and/or assisting user device 104, whether requesting user device 102 and/or assisting user device 104 has crossed a particular geofence or whether requesting user device 102 and/or assisting user device 104 is inside or outside of an area designated by a particular geofence. In some embodiments, location services server 110 may be configured to send messages and/or data to other devices, such as for example, requesting user device 102, assisting user device 104, or remote assistance device 120, upon determining that requesting user device 102 and/or assisting user device 104 has crossed a specified geofence or entered an area encompassed by a specified geofence. For example, in some embodiments, location services server 110 may be configured to trigger system environment 100 to send to requesting user device 102 a notification that a user of assisting user device 104 has entered a predetermined perimeter surrounding requesting user device 102. Such notification may provide, for example, the location of assisting user device 104, the length of time it will take assisting user device 104 to reach requesting user device 102, and other information that may be relevant to the user.

According to some embodiments, location services server 110 may receive data representative of a location that is associated with an emergency services vehicle. For example, third-party server 126 may provide data to location services server 110 representative of a location of an emergency services vehicle that has been dispatched to the location of requesting user device 102. Location services server 110 may generate, receive or access geofence information associated with the received location and may monitor location data associated with the requesting user device 102 and/or assisting user device 104 to determine when requesting user device 102 and/or assisting user device 104 has entered the location. Location services server 110 may determine that user device has entered the location by determining that, for example, requesting user device 102 and/or assisting user device 104 has crossed over the geofence associated with the received location.

In some embodiments, communication server 112 may include a computer system configured to receive, process, generate, and transmit electronic communications between a user operating user device 102, and any other computer systems necessary to accomplish tasks associated with organization 108 or the needs of users. Communication server 112 may have one or more processors 142 and one or more communication databases 144, which may be any suitable repository of communication data. Information stored in communication server 112 may be accessed (e.g., retrieved, updated, and added to) via local network 116 and/or network 106 by one or more devices (e.g., remote assistance device 120) of system environment 100.

In some embodiments, communication server 112 may track and store event data regarding interactions between user device 102 associated with a user and organization 108. For example, communication server 110 may track user interactions such as requests for assistance, responses to a request for help, interactions between users, and any other type of interaction that third-party server 126 may conduct with organization 108 on behalf of a user. According to some embodiments, communication server 112 may track and store event data regarding interactions between user device 102 associated with a user and user device 104 associated with an assisting user.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In some embodiments, components of organization 108 may communicate via network 106, without a separate local network 116.

Remote assistance device 120 may comprise one or more computer systems configured to compile data from a plurality of sources, such as location server 110, communication server 112, and transaction server 114, correlate compiled data, analyze the compiled data, arrange the compiled data, generate derived data based on the compiled data, and storing the compiled and derived in a database such as database 118. According to some embodiments, database 118 may be a database associated with organization 108 that stores a variety of information relating to users, transactions, and business operations. Database 118 may also serve as a back-up storage device and may contain data and information that is also stored on, for example, databases 134, 144, 154, 260, 270, and 280. Database 118 may be accessed by remote assistance device 120 and may be used to store data associated with one or more users.

Monitoring device 122 may comprise any type of device or sensor for obtaining information associated with either a user or a vehicle associated with a user such as a digital camera, a geographic location sensor, an input/output device such as a transceiver for sending and receiving data, a wearable device, or other similar device. Monitoring device 122 may be integrated within a vehicle associated with a user. For example, in some embodiments, monitoring device 122 may be a computer capable of monitoring vehicle parameters such as tire pressure, battery life, etc. integrated into a vehicle associated with a user. Monitoring device 122 may be include a sensor integrated into user device 102. For example, in some embodiments, merchant item sensor 122 may be an accelerometer associated with a user device. In such an embodiment, the accelerometer may detect certain motion that could correspond to emergency events, such as, for example, an accident involving a vehicle associated with the user. Monitoring device 122 may also be a sensor or device configured to monitor biometric data associated with a user. For example, in some embodiments, monitoring device 122 may be, as non-limiting examples, a pacemaker, a glucose monitor, and/or ambulatory blood pressure monitor.

According to some example embodiments, monitoring device 122 may also be an "Internet of Things device" ("IoT device"). As used herein, IoT device may refer to any object (e.g., an appliance, a sensor, a camera, a device etc.) that has an interface (e.g., an Internet protocol (IP) address, a Bluetooth identifier (ID), a near-field communication (NFC) ID, etc.) and can transmit information to one or more other devices over a wired or wireless connection. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, security cameras, door bells having integrated security cameras, etc., so long as the devices are equipped with an addressable communications interface for communicating with the IoT network. IoT devices may also include cell phones, desktop computers, laptop computers, tablet computers, personal digital assistants (PDAs), etc. According the present disclosure, such IoT devices may be configured to detect an emergency with the user, the user's home, or the user's property. For example, in some embodiments, monitoring device 122 may be a security camera capable of monitoring a user while the user is within the area of view of the security camera. In such an embodiment, the security camera may be able to detect when there is an emergency situation with the user and report to the system. In some example embodiments, monitoring device 122 may be a refrigerator. In such an embodiment, the refrigerator may be able to detect a problem with the user's home (e.g., refrigerator not cooling, spike in power provided to the home, etc.) and may be configured to report the problem to the system. According to some implementations, monitoring device 122 may be a virtual assistant (e.g., Siri, Amazon Alexa, Cortana, Google Assistant, etc.). In such embodiments, the virtual assistant may be able to detect a problem with the user (e.g., user may say speak to the assistant to report a problem) and may be configured to report the problem to the system. In light of the present disclosure, one of ordinarily skill in the art would recognize that other similar types of devices and sensors are included in this disclosure.

Although the preceding description describes various functions of web server 110, location services server 112, transaction server 114, monitoring device 122, remote assistance device 120, and third-party server 126, in some embodiments, some or all of these functions may be carried out by a single computing device, or various functions may be carried out or distributed over one or more physical or logical devices.

For ease of discussion, embodiments may be described in connection with facilitating remote assistance, and more particularly for facilitating connection between users in need of assistance and other proximate users capable of providing the assistance needed. It is to be understood, however, that disclosed embodiments may be used in many other contexts. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

Figure 2:
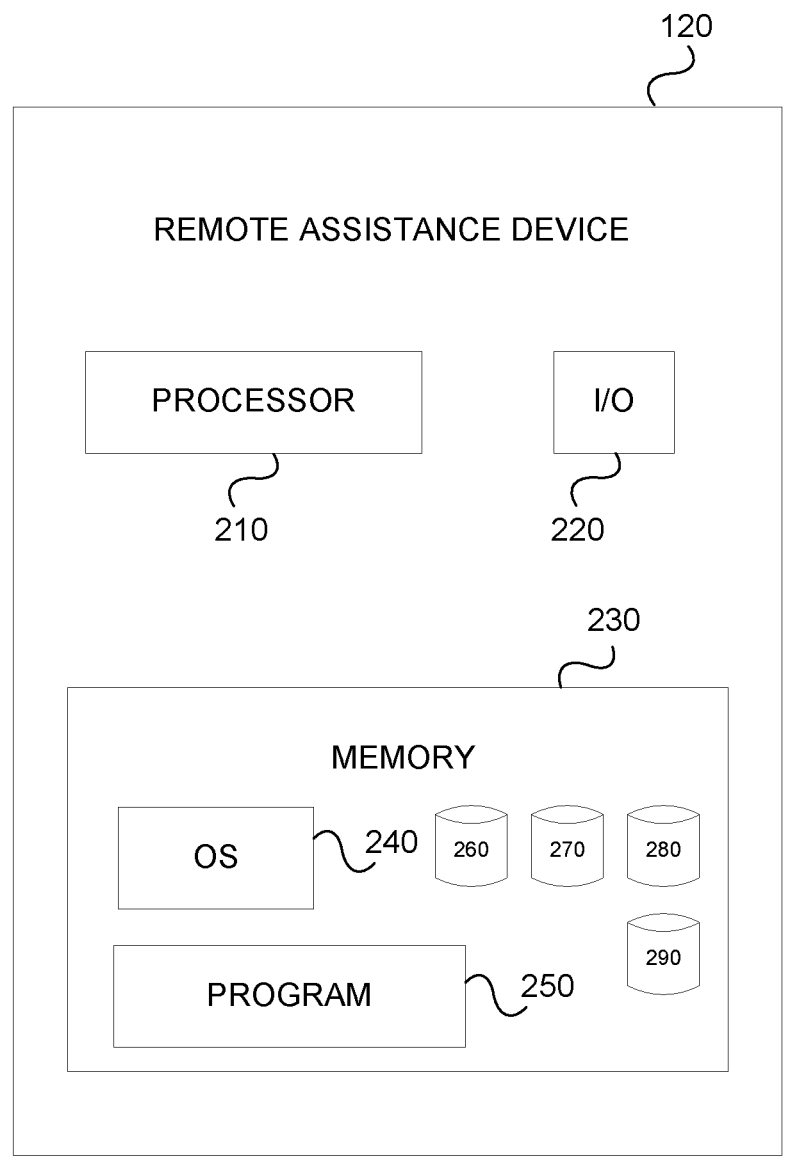
FIG. 2 is a component diagram of an example remote assistance device.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter An example embodiment of remote assistance device 120 is shown in more detail in FIG. 2. User device 102, assisting user device 104, location server 110, communication server 112, transaction server 114, monitoring device 122, and third-party server 126 may have a similar structure and components that are similar to those described with respect to remote assistance device 120. As shown, remote assistance device 120 may include a processor 210, an input/output ("I/O") device 220, a memory 230 containing an operating system ("OS") 240 and a program 250. For example, remote assistance device 120 may be a single server or may be configured as a distributed computer system including multiple servers or computers that interoperate to perform one or more of the processes and functionalities associated with the disclosed embodiments. In some embodiments, remote assistance device 120 may further include a peripheral interface, a transceiver, a mobile network interface in communication with processor 210, a bus configured to facilitate communication between the various components of remote assistance device 120, and a power source configured to power one or more components of remote assistance device 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. In some embodiments, processor 210 may be an application or authentication processor that may execute user authentication processes or other processes necessary for running an application associated with the organization 108 on user device 102. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Remote assistance device 120 may include one or more storage devices configured to store information used by processor 210 (or other components) to perform certain functions related to the disclosed embodiments. In one example remote assistance device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, remote assistance device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, remote assistance device 120 may include memory 230 that may include one or more programs 250 to perform one or more functions of the disclosed embodiments. Moreover, processor 210 may execute one or more programs 250 located remotely from system environment 100. For example, system environment 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, MySQL databases, Postgres databases, MongoDB databases, in-memory caching solutions such as Redis or Memcached, or other relational or non-relational (e.g., non sql) databases. Memory 230 may include software components that, when executed by processor 210, perform one or more processes consistent with the disclosed embodiments. In some embodiments, memory 230 may include a user account database 260, a user interaction database 270, and a user review database 280 for storing related data to enable remote assistance device 120 to perform one or more of the processes and functionalities associated with the disclosed embodiments.

User account database 260 may include stored data relating to user accounts, such as for example, user identification information (e.g., name, age, sex, birthday, address, VIP status, key user status, preferences, preferred language, vehicle(s) owned, greeting name, channel, talking points (e.g., favorite sports team), etc.), account numbers, authorized users associated with one or more accounts, login credentials, known biometric data associated with the user, and other such typical account information. User interaction database 270 may include stored data relating to previous interactions between organization 108 and a user. For example, user interaction database 270 may store user interaction data that includes records of previous requests for help, previous responses to request for help, and other such typical user interaction data. User interaction database 270 may also include stored data relating to previous interactions between different users. User review database 280 may include stored data relating to reviews of users made by other users. Although databases 260, 270, 280 have been described as being separate databases for the purposes of the present discussion, these databases may alternately be combined into one or more databases.

Remote assistance device 120 may also be communicatively connected to one or more memory devices (e.g., databases (not shown)) locally or through a network. The remote memory devices may be configured to store information and may be accessed and/or managed by remote assistance device 120. By way of example, the remote memory devices may be document management systems, Microsoft™ SQL databases, SharePoint™ databases, Oracle™ databases, Sybase™ databases, MySQL databases, Postgres databases, MongoDB databases, in-memory caching solutions such as Redis or Memcached, or other relational or non-relational (e.g., non sql) databases. Systems and methods consistent with disclosed embodiments, however, are not limited to separate databases or even to the use of a database.

Remote assistance device 120 may also include one or more I/O devices 220 that may comprise one or more interfaces for receiving signals or input from devices and providing signals or output to one or more devices that allow data to be received and/or transmitted by remote assistance device 120. In example embodiments of the disclosed technology, remote assistance device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While remote assistance device 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the remote assistance device 120 may include a greater or lesser number of components than those illustrated.

Figure 3:
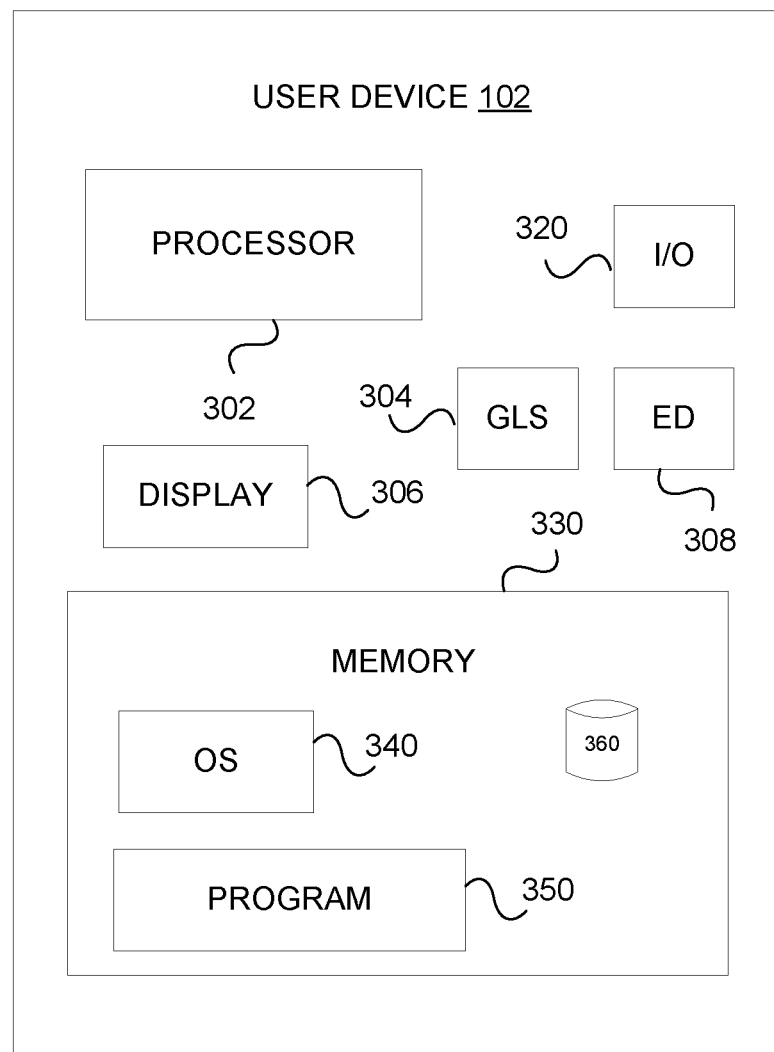
FIG. 3 is a component diagram of an example user device.

FIG. 3 shows an example interactive embodiment of user device 102. As shown, user device 102 may include an input/output ("I/O") device 320, a memory 330 containing an operating system ("OS") 340, a program 350, a database 360, and all associated components as described above with respect to remote assistance device 120. User device 102 may also include a remote assistance processor 302 for determining type of assistance needed; a geographic location sensor ("GLS") 304 for determining the geographic location of user device 102; a display 306 for displaying digital images or video; a user interface ("U/I") device 370 for receiving user input data, such as data representative of a click, a scroll, a tap, a press, or typing on an input device that can detect tactile inputs; and an environmental data ("ED") sensor 308 for detecting biometric data, identification data, and/or other similar data associated with user of user device 102. In some embodiments, an environmental data sensor 308 may include, for example but not limited to a fingerprint scanner, an eye or retina scanner, a voice recorder, a microphone, and/or a digital camera. In some embodiments, user device 102 may include one or more processors. In some embodiments, user device 102 may receive the ED sensor 308 user data and may compare (e.g., by remote assistance processor 302) the collected data with known user data. For example, in some embodiments, user device 102 may receive a voice recording of a user's voice from ED sensor 308 (e.g., saying a passphrase) and may compare (e.g., by remote assistance processor 302) the received voice recording to a verified voice recording previously received from the user. In some embodiments, a user may be required to record a verified voice record at time of registering with the system. Accordingly, the system may authenticate both the user of user device 102 and the user of assisting user device 104, increasing security to all users through verified user identities. According to some embodiments, remote assistance processor 302 may be configured with natural language processing capability such that the system is able to interpret spoken words by user's and take action corresponding to the user's speech (e.g., activate an application, initiate a request for help, and/or authorize transmittal of location information to the assisting user device 104). According to some embodiments, remote assistance processor 302 may include all of the features and functions of processor 210 described above. In some embodiments, processor 210 may be configured to perform some or all of the features and functions of remote assistance processor 302. Assisting user device 104 may have some or all of the features shown and described with respect to FIG. 3.

Figure 4:
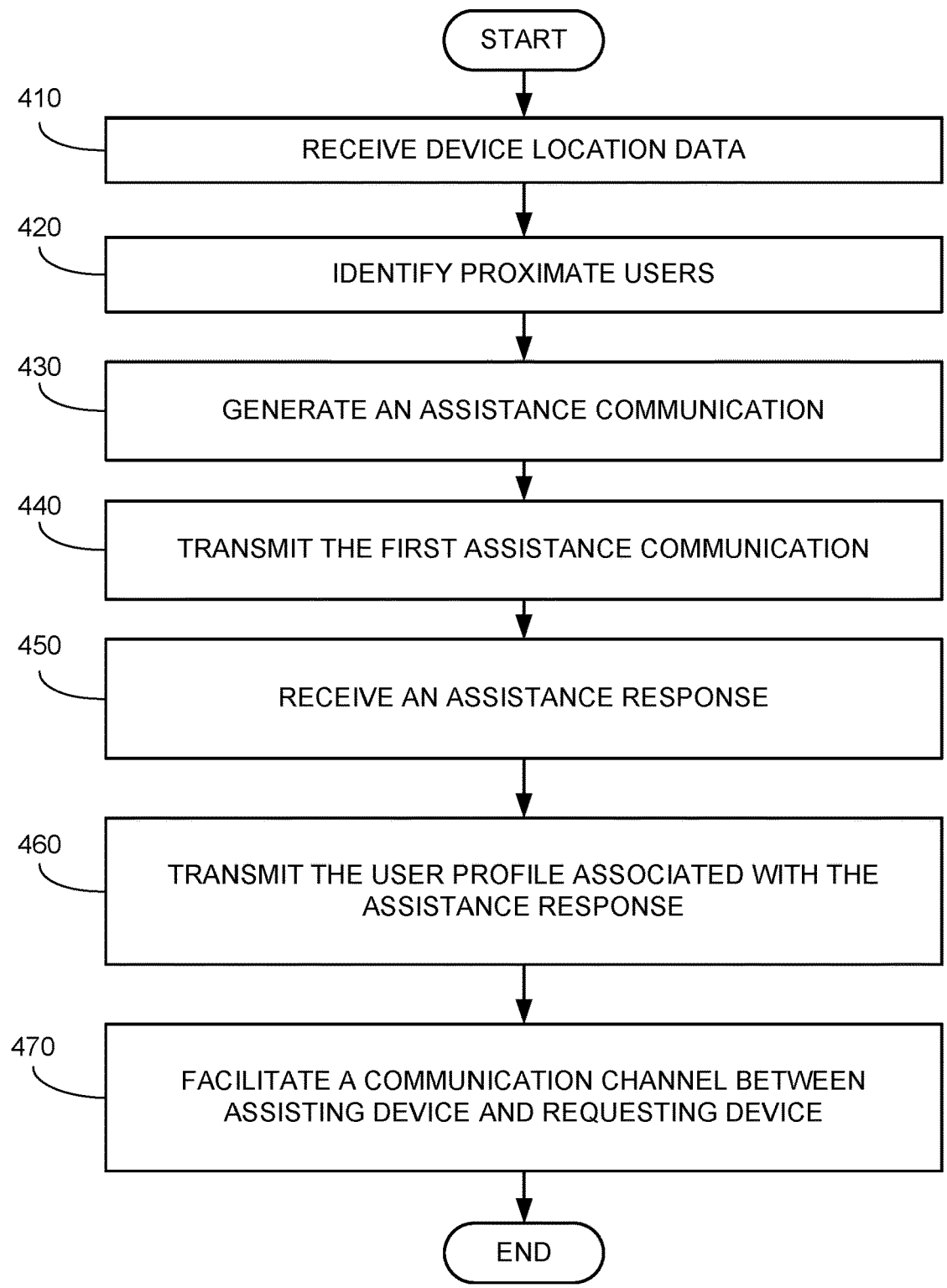
FIGS. 4-6 are flowcharts of example methods of certain aspects of the present disclosure.

FIG. 4 shows a flowchart of method 400 for facilitating remote assistance. Method 400 may be performed by remote assistance device 120 using processor 210 to execute memory 230. In some embodiments, portions of method 400 may be performed by other elements in system environment 100, such as user device 102, third-party server 126, user device 104, monitoring sensor 122, location server 110, communication server 112, or transaction server 114. Following method 400, the system, by remote assistance device 120, for example, may receive device location data from user device 102. The system may, responsive to receiving a trigger communication, identify one or more proximate user within a predefined distance from the user device. The system may generate an assistance communication, and may transmit, for example, by communication server 112 and to user device 104, the assistance communication. After receiving an indication that a user of user device 104 is willing to provide assistance, the system may transmit the profile of the user of user device 104 to the user of user device 102. And responsive to receiving an acceptance from the user of user device 102, the system may facilitate a communication channel between user of user device 102 and user of user device 104.

In block 410, organization 108 may receive from user device 102 device location data representing the location of user device 102. For example, in some embodiments, location services server 112 may receive location data through network 106 from user device 102. According to some embodiments, user device location data may include global positioning satellite (GPS) data received from user device 102. In some embodiments, user device location data may include wireless access point connection information associated with user device 102. According to some embodiments, the wireless access point connection information may include locations of one or more wireless access points. In some embodiments, user device location data may include visual information obtained from an image capture device associated with user device 102.

In block 420, organization 108 may, responsive to receiving a trigger communication from user device 102, identify one or more proximate users (e.g., user device 104) within a predefined distance of user device 102. For example, in some embodiments, organization 108 may receive location data from one or more user devices associated with other users (e.g., user device 104) and may determine users whose user devices 104 are within a predefined distance of user device 102. In some embodiments, trigger communication may comprise data indicating that there is a problem with a vehicle associated with the user of user device 102. According to some embodiments, the trigger communication received by organization 108 may comprise data representing an indication of a type of assistance needed. According to such embodiments, organization 108 may limit, based at least in part on the indicated type of assistance needed, the one or more identified users to users that are can provide the indicated type of assistance needed. For example, in some embodiments, the indicated type of assistance needed may be medical assistance and the users capable of providing the indicated type of assistance needed may comprise users with medical training. In some embodiments, the indicated type of assistance needed may be an epinephrine autoinjector, commonly referred to as an EpiPen, and the users capable of providing the indicated type of assistance needed may comprise users with an epinephrine autoinjector in their possession. According to some example embodiments, the indicated type of assistance needed may be automotive assistance and the users capable of providing the indicated type of assistance needed may comprise users with automotive training. In light of the present disclosure, one of ordinarily skill in the art would recognize that other similar types of assistance needed and provided are included in this disclosure.

In block 430, organization 108, for instance, via remote assistance device 120 may generate an assistance communication comprising data representing a prompt for assistance. In some embodiments, assistance communication may be a push notification or other suitable messaging technology. According to some embodiments, the assistance communication may comprise data representing a request for a user to indicate if they can provide an indicated type of assistance. For example, in some embodiments, assistance communication may comprise data representing a request for user to indicate whether they have automotive repair experience.

In block 440, the organization 108 may transmit, to one or more user devices (e.g., user device 104) associated with respective users of the identified proximate users, the assistance communication. For example, in some embodiments, remote assistance device 120 may send assistance communication through local network 116 to communication server 112. Communication server 112 may transmit assistance communication through network 106 to user device 104.

In block 450, organization 108 may receive, from an assisting device 104, an assistance response indicative of an indication that the user of assisting device 104 is willing to assist the user of requesting device 102. In some embodiments, an assistance response may comprise data indicative of the types of assistance that a user of assisting device 104 is able and/or willing to provide. For example, in some embodiments, communication server 112 may receive assistance response through network 106 from assisting user device 104. Communication server 112 may determine the contents of the assistance response and may forward the assistance response through local network 116 to remote assistance device 120.

In block 460, the organization 108 may transmit to user device 102 a user profile associated with the user of assisting device 104. For example, in some embodiments, remote assistance device 120 may send data representing a user profile associated with the user of assisting device 104 through local network 116 to communication server 112. Communication server 112 may transmit the data representing a user profile associated with the user of assisting device 104 through network 106 to user device 102.

In block 470, responsive to receiving, an assistance acceptance indicative of a user of the second device wishing to connect with the user of the assisting device, organization 108 may facilitate a communication channel between user device 102 and assisting device 104. In some embodiments, communication channel between user device 102 and assisting device 104 may allow for voice communication between the user of user device 102 and the user of assisting device 104. For example, in some embodiments, organization 108 may allow users to complete a phone call through voice over internet protocol (VOIP) or other similar technology. In some embodiments, communication channel between user device 102 and assisting device 104 may allow for text communication between the user of user device 102 and the user of assisting device 104. According to some example embodiments, the communication channel provides communication between user device 102 and assisting device 104 without sharing contact information. For example, in some embodiments, system may allow users to communicate within a mobile application without exchanging contacting information such as phone numbers associated with their respective user devices. In some embodiments, a communication channel between a software application running on user device 102 and a software application running on user device 104 may be encrypted using standard protocols such as TLS, TCP, SSH, or other appropriate protocols. In some embodiments, a communication channel between a software application running on user device 102 and a software application running on user device 104 may be encrypted using application or organization specific protocols specifically developed for the organization. In some cases, the communication channel may provide proxy communication between user device 102 and assisting device 104, thereby protecting the privacy of users of user device 102 and assisting device 104.

Method 400 may also comprise embodiments where the system may obfuscate the device location data received from user device 102 and transmit the obfuscated location data to assisting device 104. For example, in some embodiments, location server 110 may receive location data from user device 102. Location server 110 may then obfuscate location data. For example, in some embodiments, location server 110 may determine a neighborhood or approximately two-mile radius around the location of user device 102 and may transmit data indicating this obfuscated location instead of the location of user device 102. Such an embodiment presents the advantage of providing users of assisting devices 104 a general idea of where the assistance is needed while still protecting the privacy and location of the user of user device 102 until user authorized system to share the non-obfuscated location data.

Figure 5:
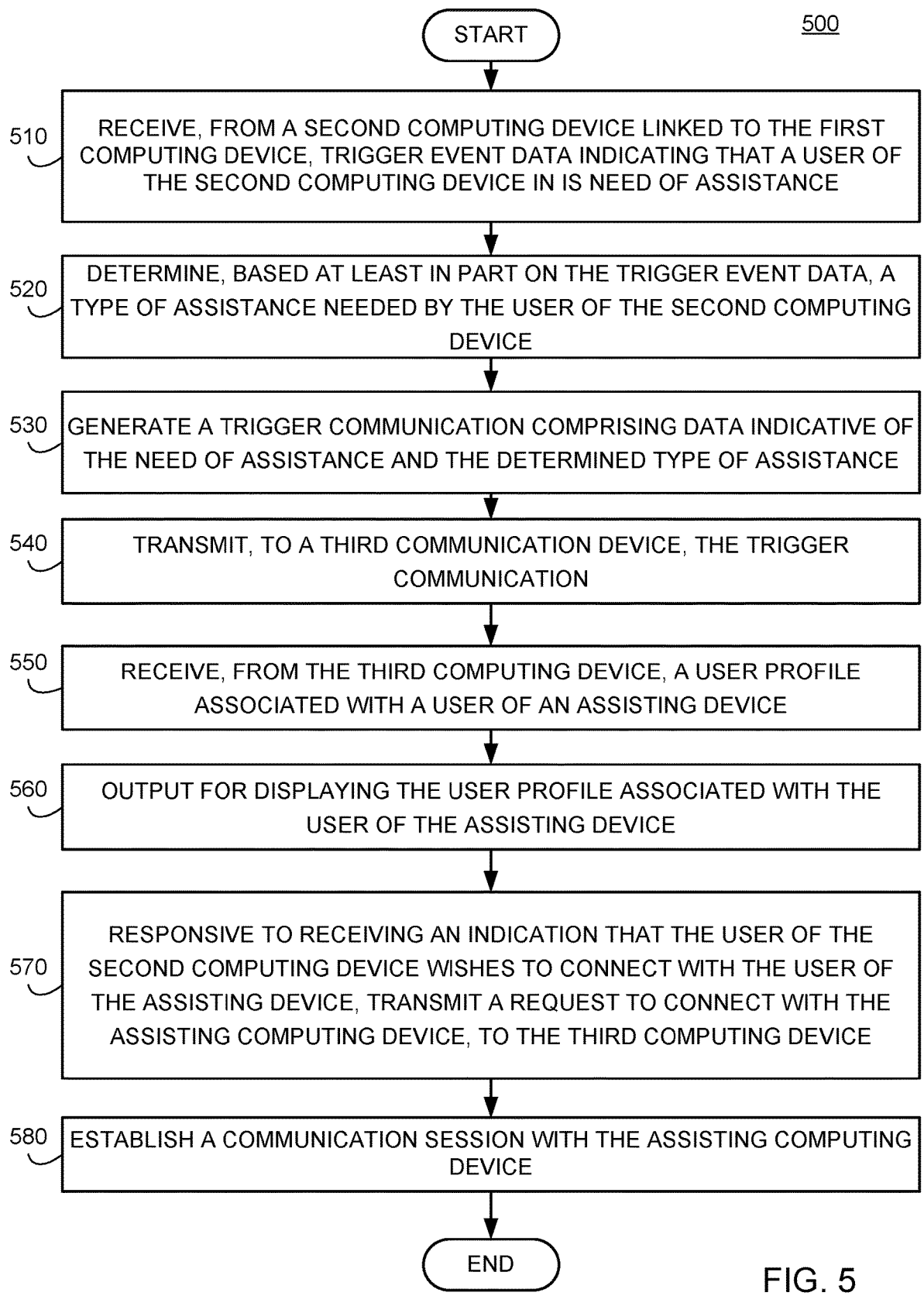

FIG. 5 shows a flowchart of a method 500 for facilitating remote assistance. Method 500 may be performed by user device 102 using processor 302 to execute memory 330. In some embodiments, portions of method 500 may be performed by other elements in system environment 100, such as user device 102, assisting device 104, third-party server 126, user monitoring device 122, location server 110, communication server 112, or transaction server 114. Following method 500, the system, by user device 102 for example, may receive from user monitoring device 122 trigger event data. The system may then determine, based at least in part on the trigger data, the type of assistance needed and generate, for example, by remote assistance device 120, a trigger communication. The system may then transmit the trigger communication and receive a user profile associated with a user of assisting device 104. Responsive to receiving an indication that a user of user device 102 wishes to connect with the user of assisting device 104, the system may transmit a request to connect and may establish a communication session between the user of user device 102 and the user of assisting device 104.

In block 510, a first computing device (e.g., user device 102) may receive, from a second computing device linked to the first computing device, trigger event data indicating that a user of the second computing device is in need of assistance. For example, in some embodiments, user device 102 may receive trigger event data from one or more user devices associated with user (e.g., a portion of user device 102, a second user device 102, and/or monitoring device 122). In some embodiments, second computing device may be a vehicle associated with the user of the first computing device. According to some embodiments, second computing device may be a monitoring device associated with the user of the first computing device. For example, in some embodiments, second computing device may be a wearable device that tracks a user's biometric data such as, for example, heart rate, oxygen levels, blood sugar levels, or other similar biometric data. In some embodiments, second computing device may be a pacemaker.

In block 520, system (e.g., user device 102) may determine, based at least in part on the trigger event data, a type of assistance needed by the user of the second computing device. In some embodiments, trigger event data may comprise data indicating that there is a problem with a vehicle associated with the user of user device 102 and/or a problem with a user of user device 102. The trigger event data may comprise data representing an indication of a type of assistance needed (e.g., medical assistance). For example, the indicated type of assistance needed may be an epinephrine autoinjector, commonly referred to as an EpiPen. According to some example embodiments, the indicated type of assistance needed may be automotive assistance. In light of the present disclosure, one of ordinarily skill in the art would recognize that other similar types of assistance needed and provided are included in this disclosure.

In block 530, system (e.g., user device 102) may generate a trigger communication comprising data indicative of the need of assistance and the determined type of assistance. In some embodiments, trigger communication may be a push notification or other suitable messaging technology.

In block 540, system (e.g., user device 102) may transmit, to a third communication device, the trigger communication. For example, in some embodiments, user device 102 may send trigger communication through network 106 to communication server 112. Communication server 112 may determine the contents of the trigger communication and may transmit trigger communication through network local 116 to remote assistance device 120.

In block 550, system (e.g., user device 102) may receive, from the third computing device (e.g., organization 108 or remote assistance device 120), a user profile associated with a user of an assisting device (e.g., device 104). For example, in some embodiments, user device 102 may receive via input/output data representing a user profile associated with the user of assisting device 104 through network 106 from communication server 112. In some embodiments, the data representing a user profile associated with the user of assisting device 104 may also include data representing a request for user of user device 102 to indicate whether or not he or she wished to connect with the user of the assisting device.

In block 560, system (e.g., user device 102) may output for display the user profile associated with the user of the assisting device (e.g., assisting device 104). For example, in some embodiments, user device 102 may, via processor 302, transmit data representing a user profile associated with a user of an assisting device 104 to display 306. In some embodiments, display 306 may be a screen associated with user device 102, such as for example a screen of a mobile phone, tablet, or other mobile computing device. According to some embodiments, data being displayed via display 306 may include a request for user of user device 102 to indicate whether or not he or she wished to connect with the user of the assisting device. In such an embodiment, in addition to displaying the user profile associated with the user of the assisting device 104, user device 104 may also display a prompt for user of user device 102 to indicate whether or not he or she wished to connect with the user of the assisting device. In some embodiments, the prompt may be a portion of the display screen. According to some embodiments, the prompt may be a separate display that is displayed to the user after the user profile associated with the user of the assisting device 104.

In block 570, responsive to receiving an indication that the user of the first computing device wishes to connect with the user of the assisting device, the system (e.g., user device 102) may transmit, to the third computing device, a request to connect with the assisting computing device. In some embodiments, a user may select an option displayed on display 306 as a way of providing an indication that the user of the first computing device wishes to connect with the user of the assisting device.

In block 580, system (e.g., user device 102) may establish a communication session with the assisting computing device (e.g., assisting device 104). Establishing a communication session with the assisting computing device may be similar to that described above with reference to block 470.

Figure 6:
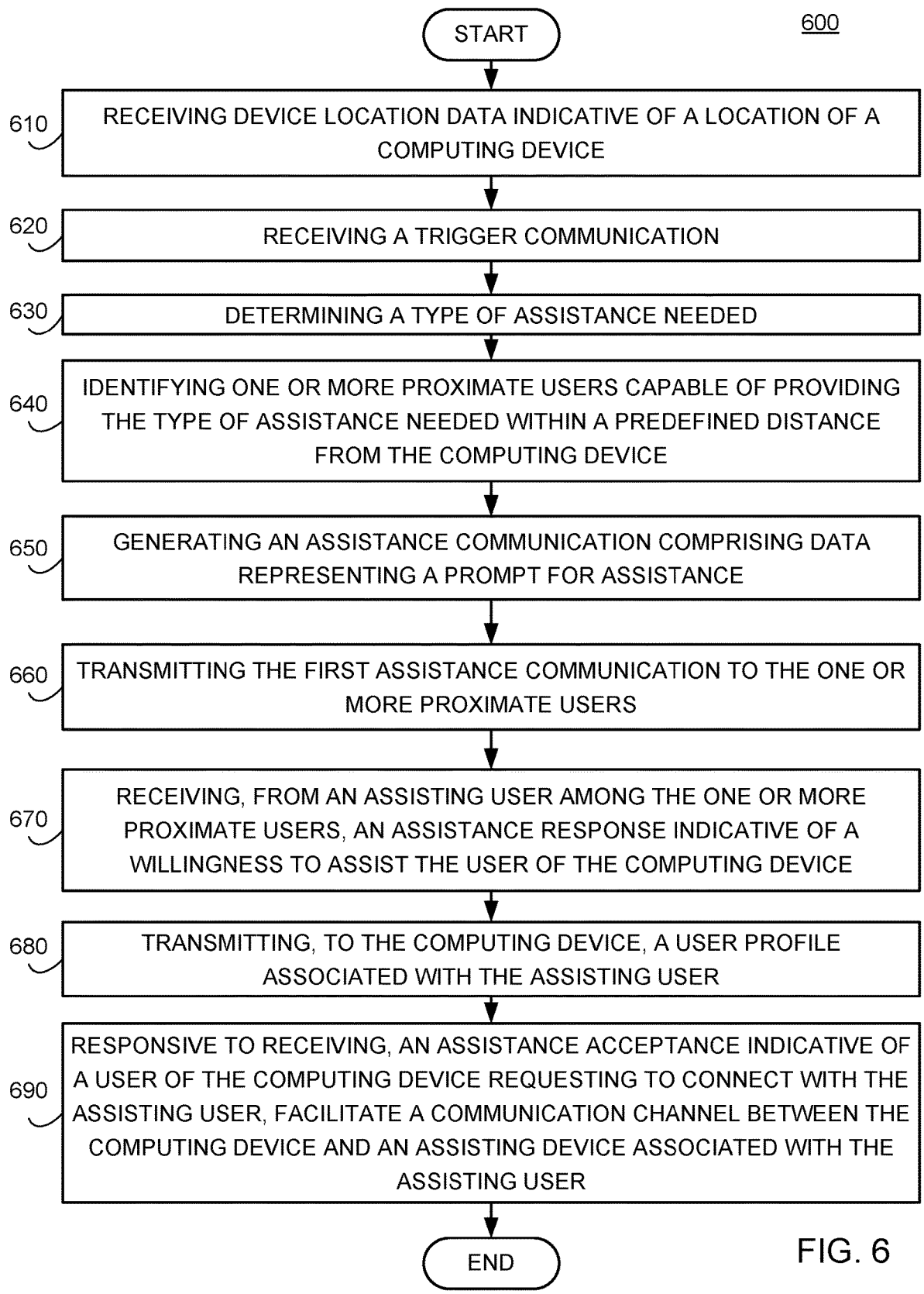

FIG. 6 shows a flowchart of a method 600 for facilitating remote assistance. Method 500 may be performed by remote assistance 120 using processor 210 to execute memory 230. In some embodiments, portions of method 600 may be performed by other elements in system environment 100, such as user device 102, assisting device 104, third-party server 126, user monitoring device 122, location server 110, communication server 112, or transaction server 114. Following method 600, the system, by user device 102 for example, may receive device location data from user device 102 and may receive from user monitoring device 122 trigger event data. System may then determine, based at least in part on the trigger data, the type of assistance needed identify one or more proximate users capable of providing the type of assistance needed. The system may generate an assistance communication, and may transmit, for example, by communication server 112 and to user device 104, the assistance communication. After receiving an indication that a user of user device 104 is willing to provide assistance, the system may transmit the profile of the user of user device 104 to the user of user device 102. And responsive to receiving an acceptance from the user of user device 102, the system may facilitate a communication channel between user of user device 102 and user of user device 104.

In block 610, system (e.g., organization 108) may receive device location data indicative of a location of a computing device (e.g., user device 102). For example, in some embodiments, location services server 112 may receive location data through network 106 from user device 102. According to some embodiments, user device location data may include global positioning satellite (GPS) data received from user device 102. In some embodiments, user device location data may include wireless access point connection information associated with user device 102. According to some embodiments, the wireless access point connection information may include locations of one or more wireless access points. In some embodiments, user device location data may include visual information obtained from an image capture device associated with user device 102.

In block 620, system (e.g., organization 108 or user device 102) may receive a trigger communication. In some embodiments, trigger communication may comprise data indicating that there is a problem with a vehicle associated with the user of user device 102. According to some embodiments, the trigger communication received by organization 108 may comprise data representing an indication of a type of assistance needed. According to such embodiments, organization 108 may limit, based at least in part on the indicated type of assistance needed, the one or more identified users to users that are can provide the indicated type of assistance needed.

In block 630, system (e.g., remote assistance device 120) may determine a type of assistance needed. For example, in some embodiments, the indicated type of assistance needed may be medical assistance and the users capable of providing the indicated type of assistance needed may comprise users with medical training. In some embodiments, the indicated type of assistance needed may be an epinephrine autoinjector, commonly referred to as an EpiPen, and the users capable of providing the indicated type of assistance needed may comprise users with an epinephrine autoinjector in their possession. According to some example embodiments, the indicated type of assistance needed may be automotive assistance and the users capable of providing the indicated type of assistance needed may comprise users with automotive training. In light of the present disclosure, one of ordinarily skill in the art would recognize that other similar types of assistance needed and provided are included in this disclosure.

In block 640, system (e.g., remote assistance device 120) may identify one or more proximate users capable of providing the type of assistance needed within a predefined distance from the computing device. For example, in some embodiments, organization 108 may receive location data from one or more other user devices associated with other users (e.g., user device(s) 104) and may determine users that are within a predefined distance of user device 102.

In block 650, system (e.g., remote assistance device 120) may generate an assistance communication comprising data representing a prompt for assistance. In some embodiments, assistance communication may be a push notification or other suitable messaging technology. According to some embodiments, the assistance communication may comprise data representing a request for a user to indicate if they can provide an indicated type of assistance. For example, in some embodiments, assistance communication may comprise data representing a request for user to indicate whether they have automotive repair experience.

In block 660, system (e.g., remote assistance device 120) may transmit the assistance communication to the one or more proximate users. For example, in some embodiments, remote assistance device 120 may send assistance communication through network 116 to communication server 112. Communication server 112 may transmit assistance communication through network 106 to user device 104.

In block 670, system (e.g., remote assistance device 120) may receive, from an assisting user among the one or more proximate users, an assistance response indicative of a willingness to assist the user of the computing device. In some embodiments, an assistance response may comprise data indicative of the types of assistance that a user of assisting device 104 is able to provide. For example, in some embodiments, communication server 112 may receive assistance response through network 106 from assisting user device 104. Communication server 112 may determine the contents of the assistance response and may forward the assistance response through local network 116 to remote assistance device 120.

In block 680, system (e.g., remote assistance device 120) may transmit, to the computing device a user profile associated with the assisting user. For example, in some embodiments, remote assistance device 120 may send data representing a user profile associated with the user of assisting device 104 through network 116 to communication server 112. Communication server 112 may transmit the data representing a user profile associated with the user of assisting device 104 through network 106 to user device 102.

In block 690, responsive to receiving, an assistance acceptance indicative of a user of the computing device wishing to connect with the assisting user, system (e.g., remote assistance device 102) may facilitate a communication channel between the computing device (e.g., user device 102) and an assisting device associated with the assisting user (e.g., assisting device 104). Facilitating a communication session between the assisting device and the computing device may be similar to that described above with reference to block 470.

Method 600 may also comprise embodiments where the system may receive from a software application running on the computing device, a requesting user communication. The system may transmit to a software application running on a device associated with the assisting user, the requesting communication. The system may receive from the software application running on the device associated with the assisting user an assisting user communication. Additionally, the system may transmit to the software application running on the computing device, the assisting user communication. According to some embodiments, the system may generate a first proxy communication data associated with the computing device. In some embodiments, the system may link the first proxy communication data to an account associated with the user of the computing device. According to some example embodiments, the system may generate a second proxy communication data associated with the assisting device. In some embodiments, the system may link the second proxy communication data to an account associated with the assisting user. According to some embodiments, the system may transmit the second proxy communication data to the user of the computing device. Such embodiments present the advantage of providing users the ability to communicate through their own devices without sharing their contact information.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a typical user flow pattern. These are intended solely for explanatory purposes and not in limitation. In one case, a user may encounter an emergency while driving and may desire to contact people in close proximity that are able to provide assistance. The user may request to receive help (e.g., user device 102). For example, the user may select an option on a mobile application (e.g., user device 102) to receive help and indicate the type of assistance needed. Once the user requests help, the system may determine (e.g., remote assistance device) the user's location and a list of assisting users who are proximate the user. For example, the system may determine a list of assisting user within five miles of the user's location. The system can filter the list of assisting users based on the assisting users' ability to provide the type of assistance needed. Once the system has determined the list of assisting users, the system may send (e.g., remote assistance device) a profile associated with one of the assisting users to the user. For example, system (e.g., remote assistance device 120) may transmit a profile associated with one of the assisting users to an application running on the user's mobile phone (e.g., user device 102). The user may then review the profile and determine whether he or she wishes to connect with the assisting user associated with the profile. If the user chooses to connect with the assisting user (e.g., selecting an option on user device 102), the system may establish a communication session between the user and the assisting user. For example, the system (e.g., remote assistance device 120) may initiate a chat session in an application running on assisting user's device (e.g., user device 104) and an application running on the user's device (e.g., user device 102). If the user does not choose to connect with the assisting user (e.g., selecting an option on user device 102), the system may present the user with a different profile associated with a different one of the assisting users.

In another case, a user may encounter an emergency while driving and may desire to contact people in close proximity that are able to provide assistance. When an emergency occurs, a device associated with the user (e.g., monitoring device 122) may transmit a request for assistance. For example, a user may wear a pacemaker, and upon detection of a serious cardiac event, the pacemaker (e.g., monitoring device 122) may send an alert to an application running on the user's cell phone (e.g., user device 102). In another example, a computer system associated with the user's vehicle (e.g., monitoring device 122) may, upon detection of an emergency related to the user's vehicle, send an alert to an application running on the user's cell phone (e.g., user device 102). Once the system receives the request for help, the system may determine (e.g., remote assistance device) the user's location and a list of assisting users who are proximate the user. For example, the system may determine a list of assisting user within five miles of the user's location. If the system has been provided or has determined the type of assistance needed by the user, the system can filter the list of assisting users based on the assisting users' ability to provide the type of assistance needed. Once the system has determined the list of assisting users, the system may send (e.g., remote assistance device) a profile associated with one of the assisting users to the user. For example, system (e.g., remote assistance device 120) may transmit a profile associated with one of the assisting users to an application running on the user's mobile phone (e.g., user device 102). The user may then review the profile and determine whether he or she wishes to connect with the assisting user associated with the profile. If the user chooses to connect with the assisting user (e.g., selecting an option on user device 102), the system may establish a communication session between the user and the assisting user. For example, the system (e.g., remote assistance device) may initiate a chat session in an application running on assisting user's device (e.g., user device 104) and an application running on the user's device (e.g., user device 102). If the user does not choose to connect with the assisting user (e.g., selecting an option on user device 102), the system may present the user with a different profile associated with a different one of the assisting users.

What is claimed is:

1. A system for facilitating remote assistance, the system comprising:
one or more processors of a first computing device; and
a memory in communication with the one or more processors and storing instructions that, when executed by the one or more processors, are configured to cause the system to:
receive device location data representing a location of a second computing device;
receive a trigger communication comprising data indicating a first type of assistance needed;
identify, responsive to receiving the trigger communication, one or more third computing devices within a predefined distance of the location of the second computing device, each user of the identified one or more third computing devices having a respective user profile indicating a type of assistance that the respective user is capable of providing;
generate an assistance communication comprising data representing a prompt for one or more users of the one or more third computing devices to indicate that the one or more users of the one or more third computing devices can provide the indicated first type of assistance needed, the prompt comprising a first proxy address associated with the second computing device;
identify a first group of the one or more third computing devices that have a respective user profile indicating that the respective user is capable of providing the indicated first type of assistance associated with the prompt;
transmit, to the first group of the one or more third computing devices identified as being within the predefined distance for the location of the second computing device and that have the respective user profile indicating that the respective user is capable of providing the indicated first type of assistance needed, the assistance communication comprising the prompt for the indication from the user and the first proxy address associated with the second computing device;
receive, from an assisting device among the first group of the one or more third computing devices, an assistance response to the prompt comprising a second proxy address associated with the assisting device and an indication from a user of the assisting device that the user of the assisting device can provide the indicated first type of assistance needed; and
facilitate a communication channel between the second computing device and the assisting device.

2. The system of claim 1, wherein the trigger communication further comprises data representing an indication that there is a problem with a vehicle associated with the user of the second computing device.

3. The system of claim 1, wherein the instructions are further configured to cause the system to:
obfuscate the device location data; and
transmit, to the assisting device, the obfuscated device location data.

4. The system of claim 1, wherein the first and second proxy addresses comprise respective proxy telephony numbers temporarily associated with the computing device and assisting device and the instructions are further configured to cause the system to:
transmit, to the second computing device, a user profile associated with the assisting device; and
receive, from the second computing device, an assistance acceptance indicating approval of the user profile associated with the assisting device.

5. The system of claim 4, wherein facilitating the communication channel is performed responsive to receiving the assistance acceptance from the second computing device.

6. The system of claim 1, wherein the first type of assistance needed is medical assistance, and only user profiles associated with the first group of the one or more third computing devices indicating that the respective user has medical training are capable of providing the first type of assistance.

7. The system of claim 1, wherein the first type of assistance needed is automotive assistance, and only user profiles associated with the first group of the one or more third computing devices indicating that the respective user has automotive training are capable of providing the first type of assistance.

8. The system of claim 1, wherein the communication channel provides communication between the second computing device and the assisting device without sharing contact information.

9. A system for facilitating remote assistance, comprising:
one or more processors; and
a memory in communication with the one or more processors and storing instructions that, when executed by the one or more processors, are configured to cause the system to:
receive, from a first computing device, a trigger event data indicating that a user of the second computing device requires a first type of assistance;
identify, responsive to receiving the trigger event data, one or more second computing devices within a predefined distance of a location of the second computing device, each of the one or more second computing devices being associated with a user profile indicating an assistance capability;
generate a prompt for a user of the one or more second computing devices to indicate that the user of the one or more second computing devices can provide the indicated first type of assistance required, the prompt comprising a first proxy address associated with the first computing device;
determine at least one second computing device, among the one or more second computing devices, has a respective user profile indicating that the assistance capability corresponds to the first type of assistance;
transmit, to the at least one second computing device, the prompt for the indication from the user and the first proxy address;
receive, from at least one second computing device, an assistance response to the prompt comprising a second proxy address associated with the at least one second computing device; and
facilitate a communication channel between the second computing device and the assisting device via the first proxy address and the second proxy address.

10. The system of claim 1, wherein the trigger event data indicates a problem with a vehicle associated with the user of the first computing device.

11. The system of claim 10, wherein the second computing device is the vehicle associated with the user of the first computing device.

12. The system of claim 9, wherein the first and second proxy addresses comprise respective proxy telephony numbers temporarily associated with the computing device and assisting device and the instructions are further configured to cause the system to:
transmit, to the first computing device, at least one user profile associated with the at least one second computing device; and
receive, from the first computing device, an assistance acceptance indicating approval of the user profile associated with the assisting device.

13. The system of claim 12, wherein facilitating the communication channel is performed responsive to receiving the assistance acceptance from the second computing device.

14. A method for facilitating remote assistance, comprising:
receiving device location data indicative of a location of a first computing device;
receiving a trigger communication comprising data indicating a first type of assistance needed by a user of the first computing device;
identifying one or more users of one or more second computing devices that are capable of providing the first type of assistance needed and within a predefined distance from the location of the first computing device, each of the one or more proximate users having a user profile indicating a type of assistance capability;
generating a prompt for the identified one or more users to indicate that the identified one or more proximate users can provide the first type of assistance needed, the prompt comprising a first proxy address associated with the first computing device;
transmitting the prompt to the identified one or more proximate users;
receiving, from a second computing device associated with an assisting user among the identified one or more proximate users, an assistance response to the prompt comprising a second proxy address associated with the second computing device; and
facilitating a communication channel between the first computing device and the second computing device via the first proxy address and the second proxy address.

15. The method of claim 14, further comprising:
receiving, from a software application running on the first computing device, a requesting user communication;
transmitting, to a software application running on the second computing device, the requesting user communication;
receiving, from the software application running on the second computing device, an assisting user communication; and
transmitting, to the software application running on the first computing device, the assisting user communication.

16. The method of claim 14, wherein the communication channel between the first computing device and the second computing device associated with the assisting user is encrypted.

17. The method of claim 14, further comprising:
generating first proxy communication data associated with the first computing device;
linking the first proxy communication data to an account associated with the user of the first computing device;
generating second proxy communication data associated with the second computing device;
linking the second proxy communication data to an account associated with the assisting user; and
transmitting the second proxy communication data to the user of the first computing device.

18. The method of claim 17, wherein:
the first proxy communication data comprises the first proxy address for communicating with the first computing device, and
the second proxy communication data comprises the second proxy address for communicating with the second computing device.

19. The method of claim 18, wherein the first and second proxy addresses comprise respective proxy telephony numbers temporarily respectively associated with the first computing device and the second computing device.

20. The method of claim 14, further comprising:
transmitting, to the first computing device, a user profile associated with the assisting user;
receiving, from the first computing device, an assistance acceptance indicating approval of the user profile of the assisting user, wherein facilitating the communication channel between the first computing device and the second computing device occurs responsive to receiving the assistance acceptance;

responsive to receiving a confirmation that the assisting user provided the first type of assistance needed to the user of the first computing device, prompting the user of the first computing device to provide a first rating for the assisting user; and associating the first rating with the user profile associated with the assisting user.

21. The method of claim 14, wherein the first computing device is a user monitoring device that comprises a pacemaker, and the trigger communication further comprises trigger event data indicative of a detection of a cardiac event of the user of the first computing device.

22. The method of claim 14, wherein the first computing device is a user monitoring device that comprises a glucose monitor, and the trigger communication further comprises trigger event data indicative of a detection of a problem with a blood sugar level of the user of the first computing device.

\* \* \* \* \*